United States Patent [19]

Bahr et al.

[11] 4,320,330

[45] Mar. 16, 1982

[54] APPARATUS AND METHOD FOR DETERMINING STEP MOTOR DRIVE PULSE TIMING BY ROTOR DISPLACEMENT

[75] Inventors: Dietrich J. Bahr; Karl-Heinz Burckardt, both of Herrenberg, Fed. Rep. of Germany

[73] Assignee: International Business Machines Corporation, Armonk, N.Y.

[21] Appl. No.: 164,430

[22] Filed: Jun. 30, 1980

[30] Foreign Application Priority Data

Sep. 5, 1979 [DE] Fed. Rep. of Germany ....... 2935800

[51] Int. Cl.³ .............................................. G05B 19/40
[52] U.S. Cl. .................................... 318/685; 318/254
[58] Field of Search ....................... 318/685, 696, 254

[56] References Cited

U.S. PATENT DOCUMENTS

| | | | |
|---|---|---|---|
| 3,863,118 | 1/1975 | Lander et al. | 318/685 |
| 4,066,941 | 1/1978 | Foster | 318/685 |
| 4,103,216 | 7/1978 | Hayes | 318/685 |

*Primary Examiner*—Gene Z. Rubinson
*Assistant Examiner*—Eugene S. Indyk
*Attorney, Agent, or Firm*—Kenneth P. Johnson

[57] ABSTRACT

Step motor control in which a coded emitter disk is formed with a plurality of sensible secondary marks between each pair of primary motor step marks for use as different optional delay times for the generation of a motor advance pulse after a step mark is sensed. A circuit is disclosed to select predetermined ones of the secondary marks which will generate motor advance pulses in a closed loop system. This arrangement of secondary marks permits the elimination of circuits of fixed delays for feedback signals which are inappropriate when the motor load or temperature varies.

8 Claims, 9 Drawing Figures

APPARATUS AND METHOD FOR DETERMINING STEP MOTOR DRIVE PULSE TIMING BY ROTOR DISPLACEMENT

BACKGROUND OF THE INVENTION

The invention concerns a method for the quantized speed control of a stepper motor as well as an arrangement for the implementation of said method.

The method and the arrangement in accordance with the invention are to be used in particular for the speed control of stepper motors for driving the print heads of metal paper printers.

In U.S. Pat. No. 4,101,006, a control circuit is described for a stepper motor driven carriage of a printer, whereby the advance pulse sequence corresponding to a predetermined speed profile can be fetched from a read-only storage.

In U.S. Pat. No. 3,628,119, a method of controlling a stepper motor is described whereby, after the motor has been started by a starting pulse, the motor control is advanced by the pulses from a coded disk, fixed to the motor shaft, and generated during each step, a single additional pulse being applied to the motor control between two step pulses to accelerate the motor from a lower to a higher speed, and one step pulse being suppressed to decelerate the motor from the higher to the lower speed.

Furthermore, U.S. Pat. No. 4,072,888 concerns a method of controlling a stepper motor whereby, after the motor has been started by means of a starting motor advance pulse, feedback pulses dependent upon the motor position are used to control the motor. This method is characterized in that the motor advance pulses triggered by preceding feedback pulses are emitted after a particular delay time has elapsed, whereby said delay time corresponds to the angular magnet wheel value associated with the respective speed or number of steps obtained as well as with the optimum torque.

From IBM Technical Disclosure Bulletin, Vol. 21, No. 4, September 1978, page 1504, it is known to use a coded disk for the position control of a metal paper printer. At its circumference this coded disk is provided with a plurality of equidistant marks which are photoelectrically sensed during rotation (of the stepper motor connected to said disk), in order to generate print pulses. In this manner the print positions along a line are synchronized independently of the motor speed.

For print a line, for example, the stepper motor driven print head of a metal paper printer has a particular speed profile. This speed profile (see FIG. 5) is marked by a starting phase (In1) at the beginning of the print line, a uniform speed phase (In2) during which the speed is approximately uniform, and by a deceleration phase (In3) at the end of the print line.

To optimize the acceleration or deceleration characteristics of the motor, deceleration pulses were applied to the stepper motor to ensure favorable deceleration characteristics, for example. These deceleration pulses acted as delayed standard control pulses. The delay time determined the size of the so-called deceleration angle which will be referred to in detail in connection with FIG. 2. As the time delay was invariably of the same magnitude, the following disadvantage was encountered:

The occurrence of speed fluctuations of the stepper motor (e.g., as a result of load variations and temperature influences) could lead to different deceleration phase angles in the delay period for deriving the deceleration pulse. As a result, the deceleration conditions obtained were not uniform. In practice that meant that for repeated line print processes the end point Z of the speed profile (see FIG. 5) would be displaced along the horizontal axis. A displacement of that point, caused by unfavorable deceleration characteristics leading to motor oscillations, meant that the original line starting point would not be adhered to after print head return and emission of a particular number of position pulses determining the line length.

This disadvantage has little or no effect on metal paper printers with relatively low speeds. However, at increasing print speeds and print resolutions it is no longer tolerable to derive the acceleration pulse from the standard control pulse by means of an electronic time delay circuit.

Therefore, it is the object of the invention to provide means for generating a deceleration or acceleration pulse at particular angular positions (meaning the angular positions of the rotor relative to the stator) of the stepper motor. In addition, it is the object of the invention to provide means for a quantized speed control of a stepper motor.

The objects are attained by providing a coding disk that moves in synchronism with the stepper motor and carries sensible first and second pluralities of marks equiangularly spaced about the disk which define relative displacements of rotor and stator. The first marks define standard control pulse locations, while the second marks further subdivide the distance between successive first marks to provide selectable values of displacement. The selected second marks are used to provide the desired delay in the application of new motor advance pulses. Circuit means including counter means are used to control the selection of actuating secondary marks from which advance pulses are generated. This arrangement provides a delay in the motor advance pulses that are sensitive only to the displacement of the motor.

The foregoing and other objects, features and advantages of the invention will be apparent from the following more particular description of a preferred embodiment of the invention, as illustrated in the accompanying drawing.

DESCRIPTION OF PREFERRED EMBODIMENT

Figure 1:
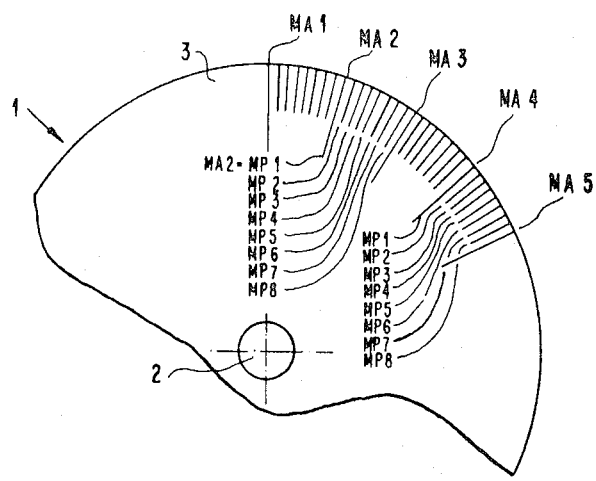
FIG. 1 is a schematic representation of a coded disk with marks for generating stepper motor standard pulses and print pulses.

FIG. 1 shows a schematic representation of a coded disk with marks for generating stepper motor control pulses. This coded disk 1 is mounted with its axle bore 2 on the axle of the stepper motor driving the print head of a metal paper printer (not shown). The print head is to be moved across the record carrier line by line. Each time the motor moves, a photoelectronic device (not shown) senses the marks MA1, MA2, MA3, etc., for deriving the standard control pulses for the motor. These marks and those arranged between them (MP2 to MP8) serve to derive the print pulses. Examples using another number of control pulses in a motor step cycle are equally conceivable. By coupling the stepper motor to the print head, the individual print positions along the print line are synchronized independently of the speed. Such synchronization is required, since the speed curve of the print head differs in a line. This speed curve is marked by a starting phase, a phase during which the speed is approximately uniform (uniform phase), and a deceleration phase at the end of the print line.

Motor drive (see also FIG. 2) is generally effected by standard control pulses at particular positions of the rotor relative to the stator. For a particular motor speed the control pulse is emitted at a particular angular position (which is speed-dependent). The angular positions for different speed values are also different. It is assumed that the angle values for controlling the speed of the stepper motor are available in the system; they may be empirically or algorithmically determined.

It is assumed by way of an example that such a standard control pulse is applied to the coil 7 of the stator pole 5 at a time when the rotor 6 is at an angle $\psi a$ relative to the stator pole. This angle is necessary for maintaining a particular speed. The clockwise direction of rotation of the rotor is marked by an arrow. If the control pulse occurred at the angular position $\psi a + \Delta \psi a$, the premature attraction of the rotor pole (north) relative to the stator pole (south) would lead to an acceleration of the motor, because of the acceleration phase angle $\Delta \psi a$. In this manner premature or delayed control pulses (as referred to standard control pulses of a corresponding angular position) can influence the speed characteristics of the stepper motor.

A delay of the standard control pulse at the angular position $\psi a$ by, for example, $\Delta \psi d$, would lead to a deceleration. This deceleration is particularly pronounced when $\Delta \psi d$ extends into the area on the right of the stator pole 5, because in such a case the south pole of the latter and the north pole of the rotor 6 would be mutually attractive opposite to the direction of rotation of the motor.

Figure 3A:
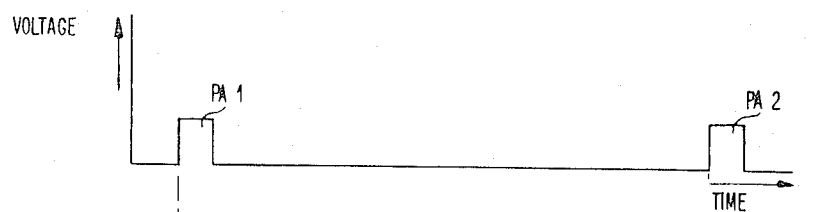
FIGS. 3A to 3C are schematic representations of pulse diagrams for deriving a deceleration pulse.

Previously, the speed was influenced, decelerated, by time delaying the standard control pulse. Such a time delay was equal to the value TD and was dimensioned in such a manner that it suited the desired deceleration phase angle $\Delta \psi d$. Further details may be seen from the pulse diagrams in FIGS. 3A to 3C.

Figure 3B:
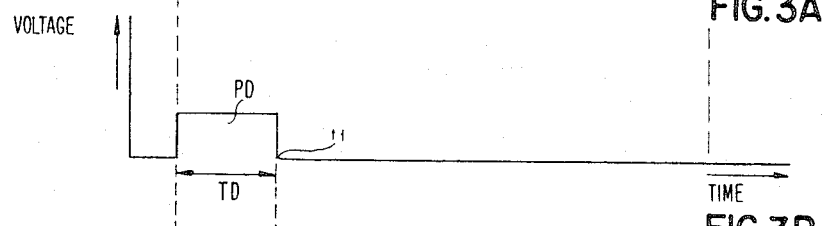
Figure 3C:
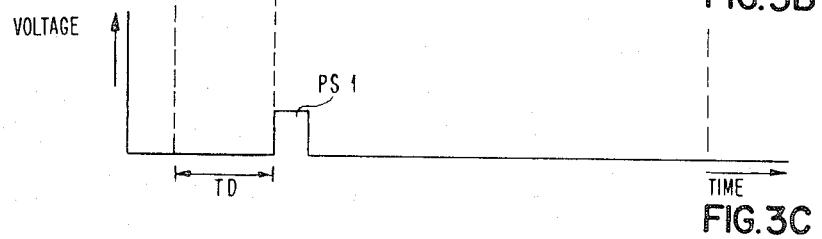

FIG. 3 shows two standard control pulses PA1 and PA2 of the stepper motor, which are separated from each other in time. These pulses are assumed to occur at times when the marks MA1 and MA2 of the coded disk are sensed. In order to generate a corresponding deceleration pulse PS1 (see FIG. 3C) on the basis of the pulse PA1, it would be conceivable to apply the pulse PA1 to a monostable multivibrator (not shown) operating at the delay time TD (see FIG. 3B). After the delay time TD has elapsed, the deceleration pulse PS1 is generated by means of the trailing edge of the multivibrator output signal PD at the time t1 and used to decelerate the stepper motor.

The delay time TD generated by the monostable multivibrator is constant. The fact that the occurrence of the deceleration pulse PS1 is solely determined by the time TD does not make allowance for speed fluctuations of the rotor occurring during that time. Such speed fluctuations may be attributable to load fluctuations or temperature influences affecting the electronic circuits. When such speed fluctuations are encountered, a fixed uniform deceleration angle $\Delta \psi d$ is no longer ensured because of the constant delay time TD. However, a change in that angle leads to deviations from the optimum deceleration characteristics. Such deviations are particularly critical in metal paper printers with a higher print speed and a very high print resolution, respectively.

Figure 4A:
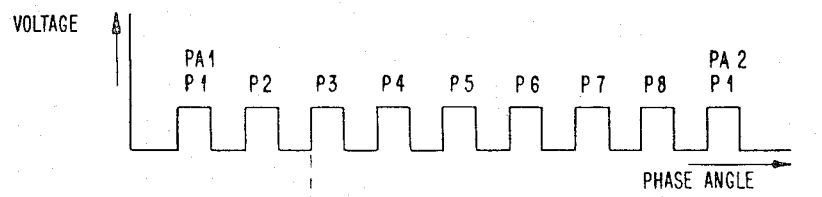
FIGS. 4A to 4B are schematic representations of pulse diagrams for deriving a deceleration pulse from the marks on the coded disks applicable for the derivation of the print pulses.

Therefore, in the case of such applications the speed profile of the stepper motor can no longer be influenced by constant time delays in the corresponding standard control pulses. Continued adherence to that principle would lead to motor oscillations and displacements of the whole speed profile along the print line and thus to a poor print image, so that after the print head has been reset by a corresponding number of print positions, as a function of an electronic count, the next line would start at another point than the previous one. To eliminate this disadvantage, the deceleration pulses are derived directly from the coded disk, to ensure that the optimum deceleration angle (e.g., $\Delta \psi d$ in FIG. 2) is strictly adhered to. For this purpose, further marks (MP2 to MP8) for deriving the print pulses are provided on the coded disk (FIG. 1) between the marks MA1, MA2, MA3, etc. for deriving the standard control pulses. All marks are sensed by a photoelectronic sensor, not shown. As a result, pulse sequences, as shown in FIG. 4A, are generated: each standard step cycle of the motor (starting, for example, at PA1 or PA2, etc.) comprises a total number of 8 print pulses P1 to P8. The first print pulse P1 of each cycle is identical with the standard control pulse PA1 (PA2, etc.) of that cycle. The occurrence of the print pulses is subject to fixed angular phase positions of the stepper motor. The spacing of these angular positions is a function of the number of print pulses used in the step cycle of a motor. It is assumed that the spacing is such that the speed profile of the motor can be most effectively influenced.

Figure 2:
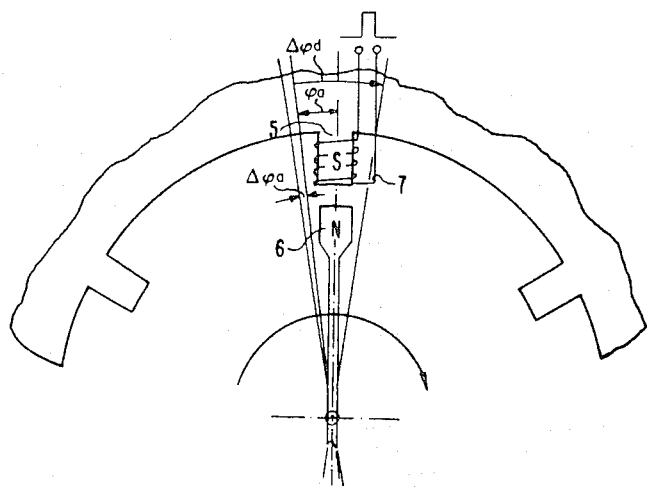
FIG. 2 is a partly schematic representation of a stepper motor showing a standard phase angle $\psi a$ for a standard control pulse and an acceleration phase angle $\Delta\psi a$ and a deceleration phase angle $\Delta\psi d$ for the acceleration and deceleration pulse, respectively.
Figure 4B:
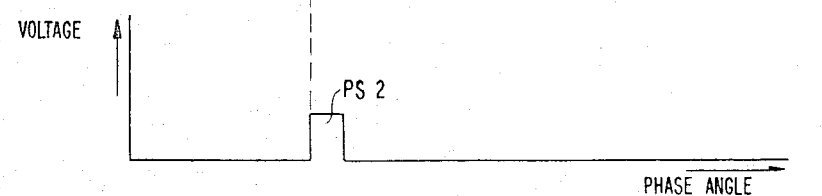

It is conceivable that the optimum deceleration phase angle $\Delta \psi d$ in accordance with FIG. 2 exists when the second mark MP3 (after MA1 or MA2 or MA3 etc.), which leads to the emission of the pulse P3 of FIG. 4A, passes the sensor. The occurrence of pulse P3 in accordance with FIG. 4B is identical with that of the deceleration pulse PS2. This ensures that, despite possible speed fluctuations of the motor in the range of the deceleration angle $\Delta \psi d$, the deceleration pulse PS2 occurs exactly at the time at which the rotor assumes the deceleration phase angle $\Delta \psi d$ (as referred to the angle $\psi a$ of the standard control pulse). This precludes the possibility of the speed profile of the motor being displaced along the print line. To ensure an optimum deceleration phase, there must be no overshooting by the motor after it has reached the "stop" position. For optimum deceleration characteristics, $\Delta \psi$ values deviating from the angular values of the different speeds are predetermined for the deceleration pulses. It is assumed that the optimum deceleration phase comprises 5 motor steps. During the individual steps the motor would operate at different average speeds V1, V2, V3, V4, and V5. For each step a deceleration phase angle $\Delta\psi1$, $\Delta\psi2$, $\Delta\psi3$, $\Delta\psi4$, and $\Delta\psi5$ is predetermined. These deceleration phase angles can be empirically or algorithmically determined. When the deceleration pulses during the 5 deceleration steps are applied in accordance with the $\Delta\psi$ values, optimum deceleration characteristics are obtained for the motor. Such optimum deceleration characteristics would not be ensured, if, for example, other given deceleration angles were used which, although leading to the value 0 of the speed curve being reached more rapidly, would cause undesirable oscillations of the motor.

Figure 6:
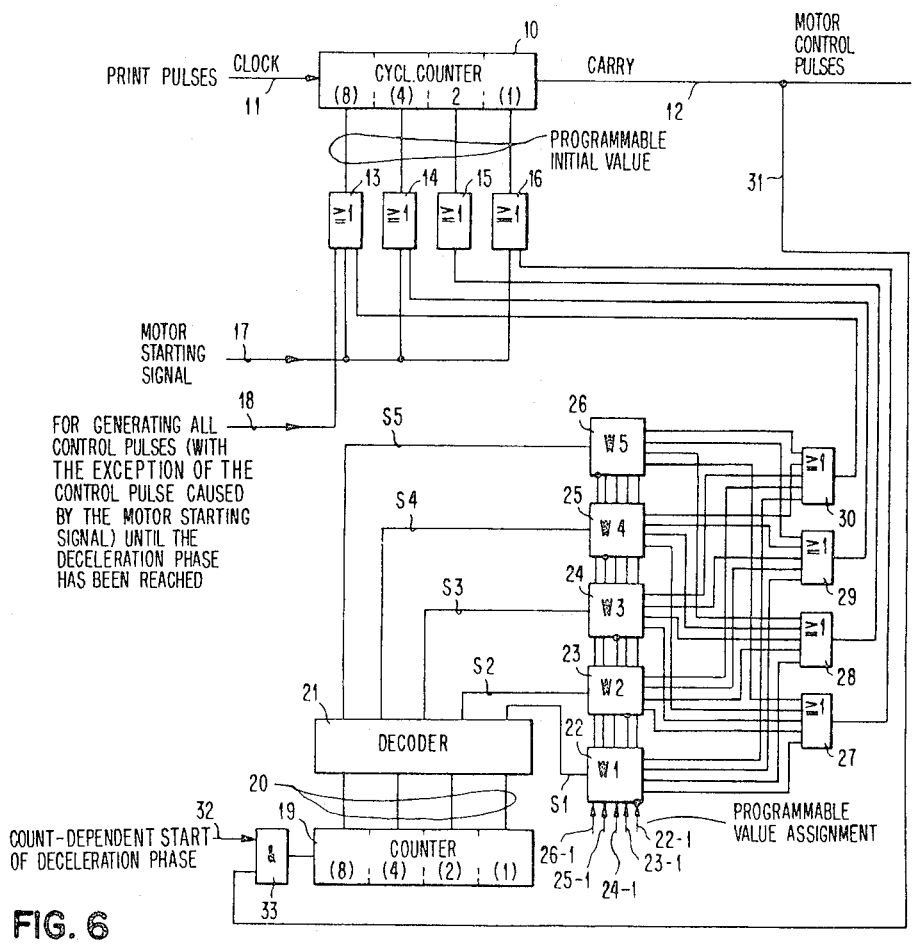
FIG. 6 is a block diagram of an arrangement for generating stepper motor control pulses at particular given angular positions.

FIG. 6 shows a block diagram of a circuit for generating the stepper motor control pulse ensuring optimum deceleration characteristics. It is assumed that 1. a motor step comprises 8 print pulses P1 to P8 (it is conceivable to use another number of steps for other embodiments) and 2. optimum deceleration of the stepper motor is to be effected in the course of 5 motor steps (other step numbers are equally conceivable).

In accordance with the 8 print pulses to be generated for each motor step, the circuit of FIG. 6 comprises a cyclic programmable binary counter 10 with 4 spaces. This counter 10 is clock-driven. The print pulses on line 11, which are derived from the marks MP1 to MP8 of the coded disk, are used as a clock. The pulses occurring on the carry line 12 of the counter 10 are used as motor control pulses. To ensure that the motor control pulses are emitted at times differing from the sensing times of the marks MA1, MA2, MA3, etc., on the coded disk, the following procedure is adopted:

The marks MA1, MA2, MA3, etc., and the marks MP2 to MP8 arranged between them are used to derive the print pulses P1 to P8 for each motor step. The counter 10 is clock-driven by these print pulses. If a motor control pulse instead of occurring at the sensing time of a mark, e.g., MA1 or MA2, is to occur, for example, two print pulses later, a corresponding initial value must be loaded into counter 10 prior to the count process beginning with MA1. This initial value must be such that the counter 10 overflows after receipt of two print pulses on clock line 11, emitting a motor control pulse on the carry line 12. For the four-stage binary counter 10, this initial value would have to be the decimal value 13 (binary 1101). Assignment of the initial value for the counter 10 is effected via the OR gates 13, 14, 15, and 16 which are connected in each case to one stage of the binary counter 10.

The function of the circuit may be readily appreciated on the basis of the previous description. In practice, the stepper motor is started by what is known as a motor starting signal which is also applied to the circuit of FIG. 6 via the line 17. This starting signal causes the motor and the coded disk connected to it to start rotating. During this process, the marks MP1, MP2, etc., are sensed. At the time the starting signal occurs the mark MA1 is defined on the coded disk, all further marks MA2, MA3, etc., thus being defined by an "eighth" count (starting with MA1 = MP1 = 1, MP2 = 2, MP3 = 3, etc., until MP8 = 8 for the first count cycle and motor step, respectively, and continuing with MA2 = MP1 = 1, MP2 2, etc., for the subsequent motor step).

For generating the motor control pulse succeeding the start signal, line 17 is activated which is connected to the OR gates 13, 14 and 16. Subsequently, these OR gates set the corresponding binary stages of counter 10 by means of their output signal.

It is pointed out that for assigning another value, if, for example, the occurrence of the motor control pulse is not to be determined by the second but by another print pulse in a motor step, line 17 must be connected to another combination of OR gates. It is also printed out that the motor control pulses are to occur always at the time of the second print pulse in a motor step during the starting and uniform speed phases. As a motor step comprises altogether 8 print pulses, it must be ensured by suitable switching means that all motor pulses following the first motor control pulse (generated at the time of the second print pulse) are generated 8 print pulses later than the preceding motor control pulse. For this purpose, line 18, which is connected to the OR gate 13, is activated to obtain the further motor control pulses for the starting and the uniform speed range of the motor until the deceleration phase has been reached. At the beginning of a count cycle, this OR gate 13, via its output line, pulses the highest value stage, marked (8), of the binary counter 10. In this manner, the initial value 8 is set in counter 10 after the first motor control pulse has been generated, so that said counter emits a fresh motor control pulse after eight further print pulses acting as a clock. As previously mentioned, this new motor control pulse occurs 8 print pulses later than the preceding motor control pulse.

For the deceleration phase, an initial value for each assumed motor step is assigned to counter 10 in a particular manner. In the case of the present embodiment it is assumed, as previously indicated, that the deceleration phase comprises altogether 5 motor steps. The motor control pulse for each motor step is to be generated upon the occurrence of a particular print pulse during a motor step.

Thus, it is conceivable, for example, that the motor control pulse for the first step occurs during the first print pulse, for the second step during the fourth print pulse, for the third step during the second print pulse, for the fourth step during the fourth print pulse, and for the last and fifth step during the third print pulse. These values, by means of which optimum deceleration of the motor, and its complete standstill without oscillations, is to be effected after five steps, may be determined either by means of an algorithm (using a program computation) or by means of a test and be stored in the form of a program. These values are used if during the deceleration phase the counter 10 is loaded with a corresponding initial value for each assumed motor step prior to the actual count process. This initial value must ensure that the motor control pulses occur on the carry line 12 of the counter 10 at the desired print pulse times.

Upon the occurrence of the last motor control pulse during the so-called uniform speed phase of the motor, a corresponding initial value is assigned to counter 10 for the assumed five subsequent motor steps of the deceleration phase for each count cycle. The deceleration phase is indicated by a signal on line 32. This signal is derived from the count of the individual motor steps for the starting and the uniform speed phase. It is applied to an AND gate 33, the second input of which is connected to the carry line of the counter 10. Via the output of the AND gate 33, the four-stage binary counter 19 is pulsed. The outputs of the individual stages of this counter are connected to a decoder 21 via lines 20.

According to the five predetermined motor steps for the deceleration phase, this decoder comprises five output lines S1 to S5 which for value assignment are connected to one circuit each W1 to W5 (22 to 26). These circuits W1 to W5 may effect either a permanently wired value assignment or they may be designed in such a manner that value assignment is effected under the control of a program. The switches required for such programmable value assignment are nothing special and thus will not be described in detail. The value assignment circuit W1 (22) is connected to a control line 22-1 on which a corresponding value assignment is effected for said circuit (binary value assignment would be limited to "set" or "do not set" a binary state). It is also pointed out that for value assignments exceeding a simple binary state, the value assignment circuit consists of several binarily weighted stages, each of which is separately addressable. The other circuits 23 to 26 are correspondingly connected to the value assignment circuits 23-1 to 26-1.

The value to be assigned by all circuits W1 to W5 (i.e., the initial value for counter 10) is determined by the print pulse within a motor step, at which the the desired motor control pulse is to occur. A corresponding initial value determining the time of the motor control pulse is to be set in counter 10. As counter 10 in the embodiment described has four binary stages and each binary stage is connected to one of the OR gates 13 to 16, via which counter 10 receives its initial values, the four outputs of the value assignment circuits 22 to 26 are connected to one of said OR gates 13 to 16. For clarity's sake, the four outputs of the value assignment circuits are not directly connected to each of the OR circuits 13 to 16 but, instead, a set of four OR gates 27 to 30 is connected in between the former and the latter.

The value assignment mode will be described below by way of an example. During the first step of the deceleration phase, line S1 is activated. This line causes the value assignment circuit W1 (22) to emit corresponding binary signals to the four OR gates 27 to 30, the outputs of which are connected to one stage each of counter 10 via the OR gates 13 to 16. Advancing the counter 19 from one motor step to another during the deceleration phase causes the output lines S1 to S5 of the decoder to be successively activated. In accordance with the value assignments, predetermined values are set in counter 10 during each motor step. It would have been easier from the circuit point of view, although less clear from the point of view of the drawings, if OR gates 13 to 16 had been shown to carry out the function of OR gates 27 to 30. Another reason for using the binary counters 10 and 19, although their capacity is overdimensioned in some cases, was that they are readily commercially available. For clarity's sake, the resetting and control lines for gating the initial values into the counter have not been considered.

The circuit shown in FIG. 6 can be extended by applying the motor control pulses via a delay circuit (not shown). In the absence of such a delay circuit, the occurrence of only the slightest motor oscillations would prevent the generation of a new motor control pulse at a speed close to zero, because such oscillations would prematurely set the motor speed to zero. (Note that such slight motor oscillations can generally be neglected, with the exception of speeds close to the value zero). The delay element permits generating the last control pulse at a time at which motor oscillations, if any, are encountered and using such oscillations as a principal control variable. In this manner, the final motor step would always be clearly defined. It is pointed out that when a delay element is used, the delay time of such a delay element has to be considered for all phase angle values of the system.

The embodiment shown in FIG. 6 is limited to the deceleration phase of the stepper motor. The principle of step optimization pursued in that case, i.e., a motor control pulse occurs upon the emission of a particular print pulse in a motor step, is equally applicable to the starting and the uniform speed phase of the motor, respectively.

Figure 5:
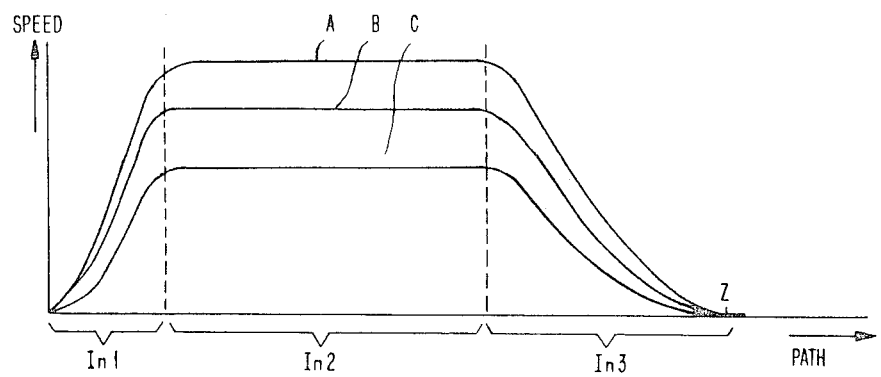
FIG. 5 is a schematic representation of different speed profiles.

By using corresponding motor control pulses which are generated at the time of occurrence of particular print pulses, the motor speed during the uniform speed phase is influenced in such a manner that it is approximately constant. By suitably selecting the time of the motor control phase, it is also possible to achieve different speeds, as may be seen from the representation in FIG. 5, curves A, B and C.

It is the use of microprocessors in particular that permits generating particular theoretically predetermined speed profiles. For this purpose, the microprocessors can control the pulse control sequence of the stepper motor, taking into account the various acceleration and deceleration phase angles for the individual motor steps. Deviations from a predetermined speed profile can be measured by conventional means (e.g., by time measurement between two subsequent print pulses), and as a function of such deviations the microprocessor could control the stepper motor into the desired speed range.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for controlling the profile of relative velocity between the rotor and stator of a stepping motor by producing motor advance pulses at times dependent upon the relative displacement of said rotor and stator comprising:
   disk means mounted for rotation with said rotor bearing sensible first indicia arranged equiangularly on said disk and a plurality of sensible second indicia arranged equiangularly between each pair of said first indicia on said disk; and
   counter means operable to produce said motor advance signals, said counter means being settable with values corresponding to increments of rotor displacement at which each motor advance signal is to be supplied and being incrementally advanced to said displacement values by pulses representing said first and second indicia.

2. Apparatus as described in claim 1 wherein said counter means has a predetermined count capacity and provides a said motor advance signal when filled and said counter means is set with the complement of the number of increments of displacement represented by said pulses at which a motor advance signal is to occur.

3. Apparatus as described in claim 1 wherein said counter means includes means responsive to a predetermined number of pulses representing said first indicia and said advance pulses for setting successive displacement values in said counter means during deceleration of said motor.

4. Apparatus as described in claim 1 wherein said counter means is settable with a said corresponding value in response to a said motor advance pulse.

5. Apparatus for controlling the profile of relative velocity between the rotor and stator of a stepping motor during acceleration or deceleration comprising:
- a disk mounted for rotation with said rotor and bearing first sensible indicia arranged equiangularly about said disk and a plurality of second sensible indicia about said disk arranged equiangularly between each pair of said first indicia;
- cyclic counter means incremented by pulses representative of each of said first and second indicia and operable on being filled for producing a motor advance signal; and
- means responsive to ones of said motor advance signals for presetting selected values in said counter means causing said advance signal to occur at varying displacements of said rotor beyond said selected ones of said first indicia.

6. The method of varying the point of application of advance signals to a stepping motor to thereby vary the relative velocity profile between the rotor and stator of said motor during acceleration or deceleration comprising the steps of:
- determining the successive positions for applying each standard advance signal to produce said relative velocity; and
- selectively changing the point of application of an advance signal from one of said standard signal positions by a discrete value of relative displacement between said rotor and said stator by counting a predetermined number of displacement increments between successive standard signal positions.

7. The method of claim 6 further including the step of using a said changed advance signal to set said discrete value for the succeeding advance signal from its standard position.

8. The method of claim 6 further including the step of selectively delaying an advance signal from a said standard signal position and using said delayed advance signal to set the delay of the succeeding advance signal from its standard position.

* * * * *